United States Patent [19]

Anderson et al.

[11] Patent Number: 5,532,556
[45] Date of Patent: Jul. 2, 1996

[54] MULTIPLEXED DIGITAL AUDIO AND CONTROL/STATUS SERIAL PROTOCOL

[75] Inventors: Eric C. Anderson, San Jose; David F. Wilson, Los Altos; William V. Oxford, San Jose, all of Calif.

[73] Assignee: Apple Computer, Inc., Cupertino, Calif.

[21] Appl. No.: 314,538

[22] Filed: Sep. 28, 1994

Related U.S. Application Data

[63] Continuation of Ser. No. 881,842, May 12, 1992, abandoned.

[51] Int. Cl.[6] .................................. H04L 7/00; H04J 3/12
[52] U.S. Cl. ..................... 375/356; 375/220; 375/368; 370/105.1; 370/110.4; 381/2; 381/77; 379/67; 369/1
[58] Field of Search ............................. 370/110.1, 110.4, 370/111, 105.1, 105.2, 103, 85.11, 100.1, 105.5, 101, 105.4; 381/2, 77; 375/356, 238, 220, 257, 368; 369/1; 379/67; 371/37.1, 42, 47.1

[56] References Cited

U.S. PATENT DOCUMENTS

| | | | |
|---|---|---|---|
| 4,213,011 | 7/1980 | Hoelzl et al. | 370/100 |
| 4,229,816 | 5/1980 | Breidenstein et al. | 370/100 |
| 4,567,587 | 1/1986 | McDermott | 370/13 |
| 4,750,167 | 6/1988 | Meyer | 370/77 |
| 4,787,085 | 11/1988 | Suto et al. | 370/110.1 |
| 5,003,557 | 3/1991 | Fujiyama | 375/108 |
| 5,214,705 | 5/1993 | Kloker et al. | 381/2 |

OTHER PUBLICATIONS

Stallings, Data & Computer Communications, 1994, pp. 838, & 187–197.

Primary Examiner—Young T. Tse
Assistant Examiner—William Luther
Attorney, Agent, or Firm—Blakely, Sokoloff, Taylor & Zafman

[57] ABSTRACT

A protocol for transferring audio data and control/status data between audio functional units. The protocol involves multiplexing the audio data and control/status data. The multiplexed data is then transferred between a first audio unit and a second audio unit on two wires, each corresponding to the direction of data flow, and according to a clock rate and a synchronization pattern on third and fourth wires respectively.

11 Claims, 4 Drawing Sheets

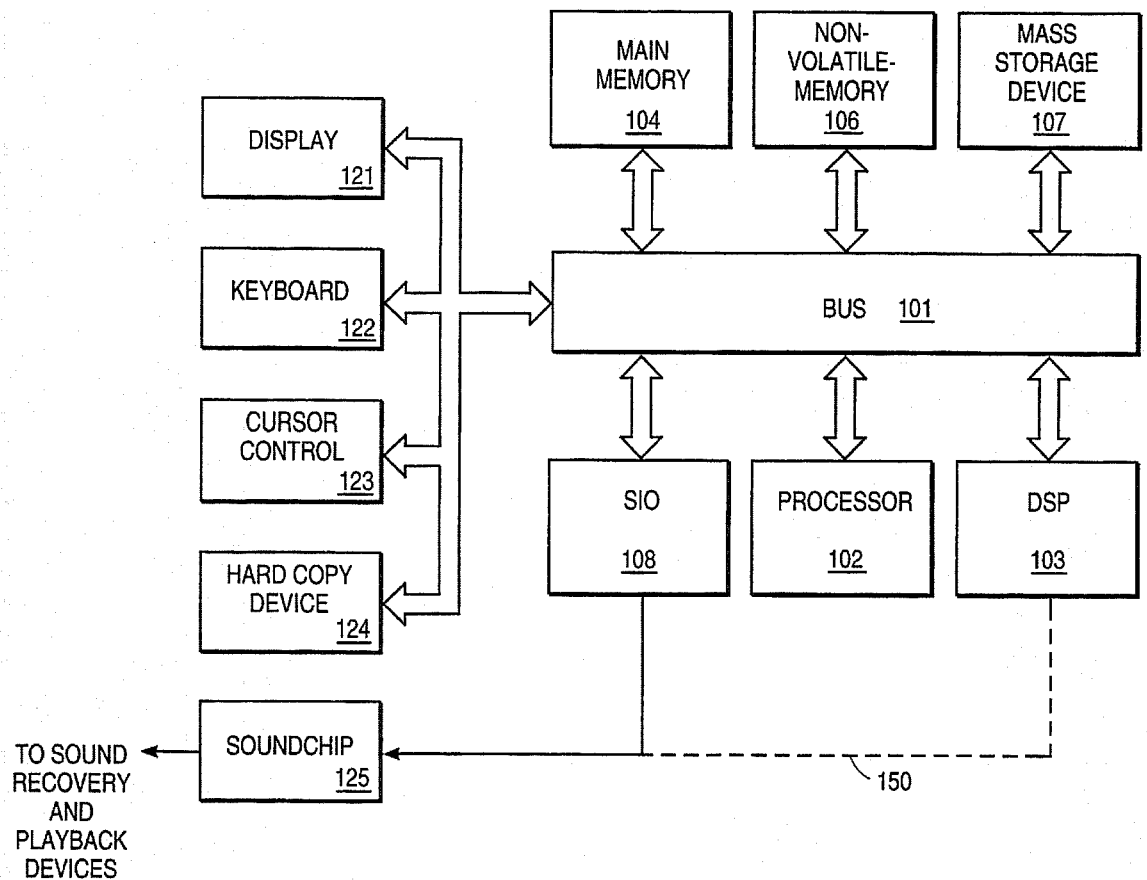
FIG_1
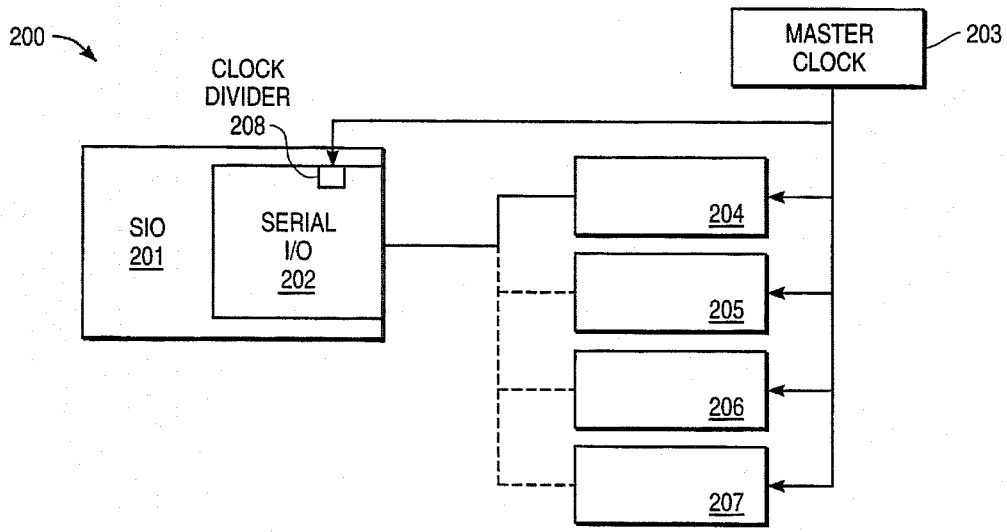
FIG_2

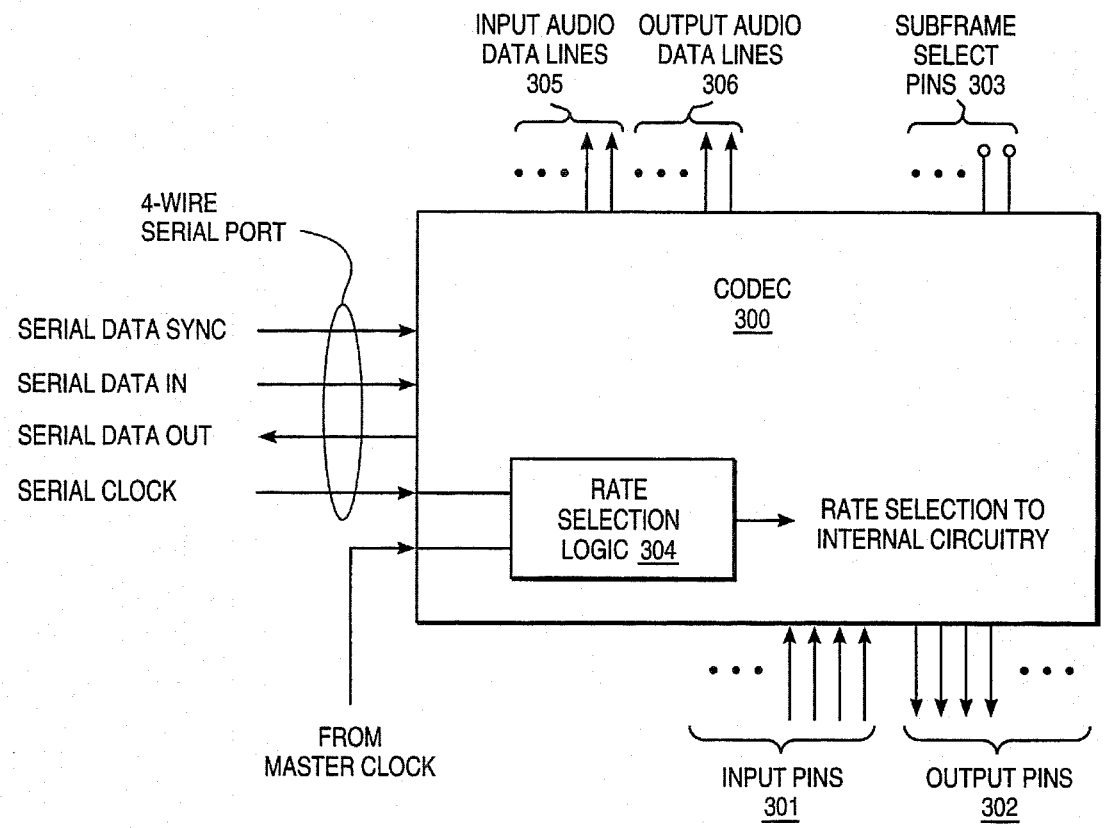
FIG_3
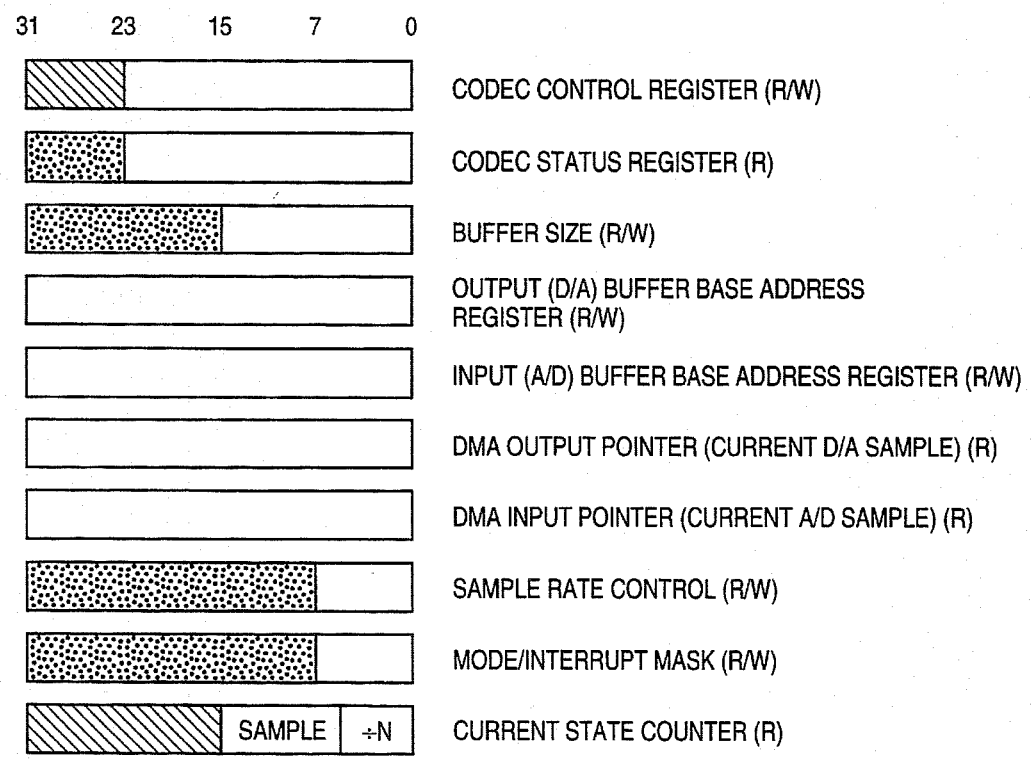
FIG_4

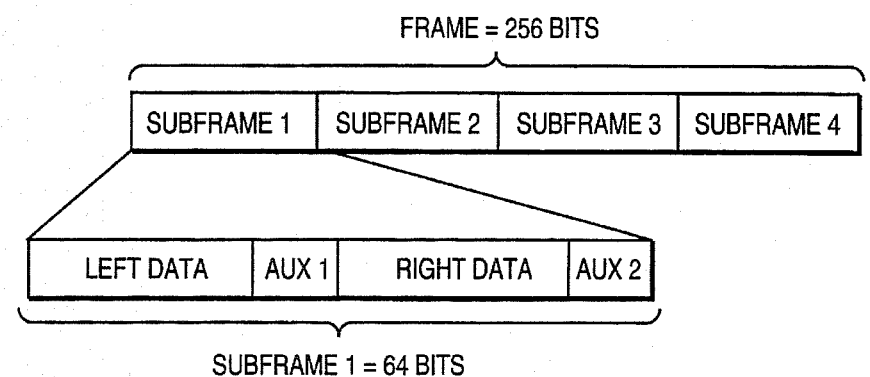
FIG_5
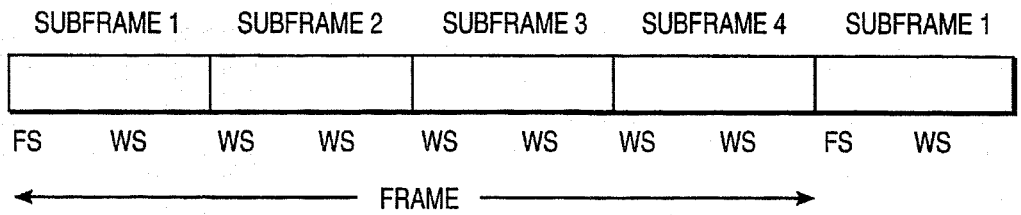
DIAGRAM OF A SINGLE FRAME WITH FOUR SUBFRAMES
FS = FRAME SYNC
WS = WORD SYNC
FIG_6
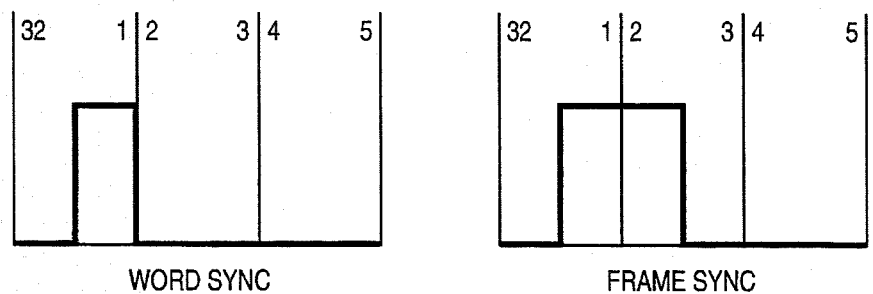
FIG_7

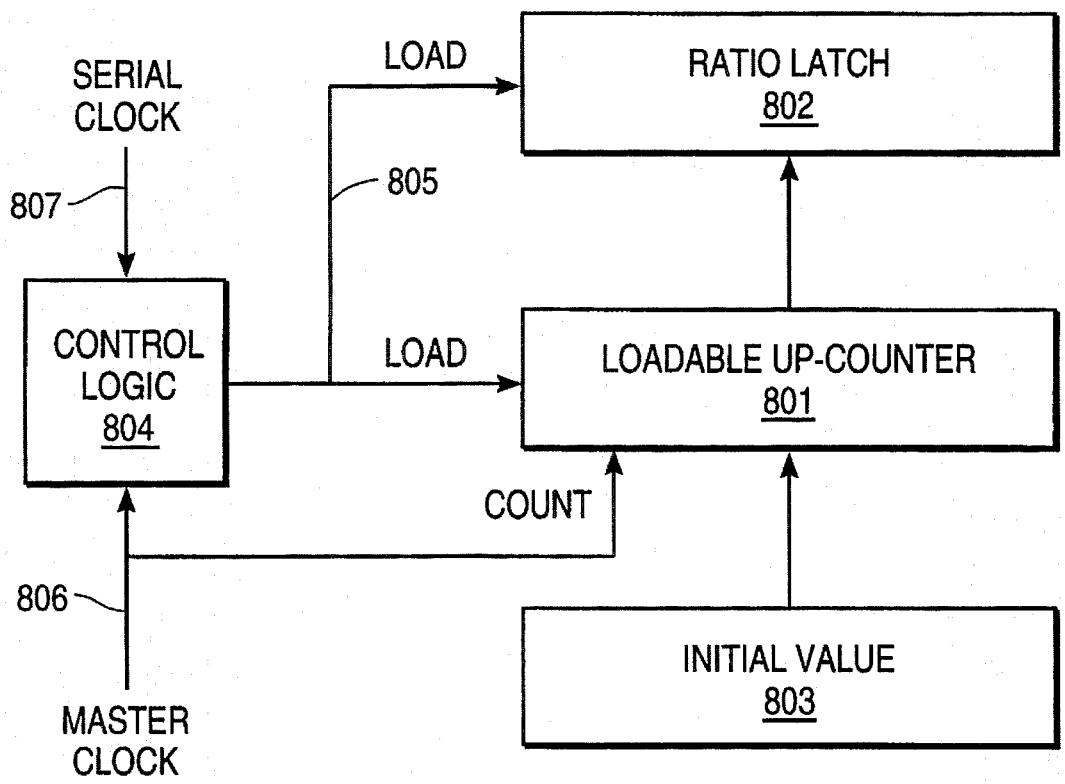
FIG_8

MULTIPLEXED DIGITAL AUDIO AND CONTROL/STATUS SERIAL PROTOCOL

This is a continuation of application Ser. No. 07/881,842 filed May 12, 1992, now abandoned.

FIELD OF THE INVENTION

The present invention relates to the field of audio signal processing; in particular, the present invention relates to protocols utilized to transfer data between the signal processing hardware and the audio devices, or between two audio functional units.

BACKGROUND OF THE INVENTION

Today, signal processing is performed on a wide range of computer systems. The range of signal types processed by such computer systems include audio signals. The source of these audio signals could be a microphone, a sound playback machine, etc. The processing of these audio signals is usually accomplished using a separate signal processing chip. The signal processing chips operate on the audio signals through the use of audio data converters, which receive the audio signals and put them in a form upon which the signal processing chip can operate.

Audio data converters typically only serve the function of providing conversions from an audio signal format into a bit format on which the signal processing chips on a computer system can act. Additional functions such as output gain, input gain, muting, filtering, and sample rate selection are usually performed using external circuitry and not the audio data converters. Other functions such as overflow protection, error detection, and I/O bit operations are incorporated into some converter chips of the prior art. Typically, the reason for the exclusion of the additional functions on the converter chips is due to the fact that the converter chips are expensive in themselves and additional features would only add to their overall expense.

The transfer of data between the converter chips and the signal processing chips is usually accomplished according to a distributed algorithm, known as a protocol. The protocol interconnects the audio processing system to the audio data converters in a manner which allows each to communicate in a recognizable manner. Thus, the protocol allows the audio processing system and the audio data converters to interact in a cohesive way.

When data is transferred between the audio data converters and the audio processing system, data is typically transferred between ports on the audio processing chip and on the audio data converter chip. One prior art technique for transferring data between the audio data converters and the audio processing system involves the use of two separate serial ports. One of the serial ports is used for transfers of data in the form of a bitstream. The other serial port is used for sending control signals to the external circuitry which would perform output and input gain, muting, filtering, and sample rate selection, etc., since these functions are not typically preformed by the audio converter chips. Information indicating the status of these operations would be returned on this serial port from the external circuitry. Thus, the control and status information are transferred on the second serial port coupled between the audio processing chip and external circuitry. Another prior art method also uses a serial port for transferring audio data. However, one or more parallel ports are also employed to provide parallel bits (i.e., pins on the package) for manipulating some external functions.

Another prior art method of transferring data between audio converters and the audio processing system is the AES/EBU protocol. The AES/EBU protocol interconnects digital audio devices using a serial port. Some of the bits in the bitstream transferred on the serial port contain status information. This information usually involves error correction and mode, but not control information. Furthermore, the AES/EBU protocol is utilized for interconnecting equipment to equipment in a uni-directional interface, such that the information is only transferred one direction.

As will be shown, the present invention involves a protocol for transferring data between an audio digital processing system and an audio data converter system. The protocol includes the transferring of multiplexed digital audio data and control/status information serially. Thus, protocol of the present invention transfers digital audio and control/status information serially on the same interconnection between the audio signal processing and audio data converters of a computer sound subsystem.

SUMMARY OF THE INVENTION

A protocol for transferring audio data and control/status data between two audio functional units is described. The protocol of the present invention involves two steps. The first step is combining the audio data with control and status data (i.e. auxiliary data). In the currently preferred embodiment, the audio data is multiplexed with the control and status data. The second step is transferring the combined data on a first and second connection path (e.g., wires). The step of transferring occurs such that if the combined data is being transferred from a first audio functional unit to a second audio functional unit or is being transferred from the second audio functional unit to the first audio functional unit, it is transferred on the first and second connection paths respectively. Furthermore, the transferring step occurs according to a sample clock rate on a third connection path and a synchronization pattern on a fourth connection path.

BRIEF DESCRIPTION OF DRAWINGS

The present invention will be understood more fully from the detailed description given below and from the accompanying drawings of the preferred embodiment of the invention, which, however, should not be taken to limit the invention to the specific embodiments, but are for explanation and understanding only.

FIG. 1 is a block diagram of the computer system of the present invention.

FIG. 2 is a block diagram of the sound subsystem of the present invention.

FIG. 3 is a block diagram of the codec of the present invention.

FIG. 4 illustrates some of the registers utilized by the serial interface of the signal processor of the present invention.

FIG. 5 illustrates the currently preferred embodiment of a frame transferred by the serial protocol.

FIG. 6 illustrates the frame and subframe synchronization for the present invention.

FIG. 7 illustrates the data synchronization pulse of the currently preferred embodiment of the present invention.

FIG. 8 illustrates one embodiment of the rate control logic for the codec.

DETAILED DESCRIPTION OF THE INVENTION

A multiplexed digital audio and control/status serial protocol is described. In the following description, numerous specific details are set forth, such as specific clock rates, numbers of bytes, bits, wires, etc., in order to provide a thorough understanding of the preferred embodiment of the present invention. It will be obvious to one skilled in the art that the present invention may be practiced without these specific details. Also, well-known circuits have been shown in block diagram form, rather than a detail, in order to avoid unnecessarily obscuring the present invention.

In addition, in describing the present invention, reference is made to signal names peculiar to the currently preferred embodiment. Reference to these specific signal names should not be construed as a limitation on the spirit or scope of the present invention.

Overview of the Computer System of the Present Invention

Referring to FIG. 1, an overview of a computer system of the present invention is shown in block diagram form. It will be understood that while FIG. 1 is useful for providing an overall description of the computer system of the present invention, a number of details of the system are not shown. As necessary for disclosure of the present invention, further detail is set forth with reference to the other figures provided with this specification. Further, the present invention is described with reference to its preferred embodiment; alternative embodiments which may be conceived by one of ordinary skill in the art are considered within the scope of the claims set forth below.

The present invention may be implemented on a general purpose microcomputer, such as one of the members of the Apple Macintosh™ family, one of the members of the IBM personal computer family, or one of several audio computer devices which are presently commercially available. Of course, the present invention may also be implemented on a multi-user system while encountering all of the costs, speed, and function advantages and disadvantages available with these machines. The preferred embodiment of the present invention is implemented on an Apple Macintosh™ computer system developed by the assignee of the present invention.

As illustrated in FIG. 1, the computer system of the present invention generally comprises a bus or other communication means 101 for communicating information, a processing means 102 coupled with bus 101 for processing information, a digital signal processor 103 for processing audio information, a random access memory (RAM) or other dynamic storage device 104 (commonly referred to as a main memory) coupled with bus 101 for storing information and instructions for processing means 102 and digital signal audio processing means 103, and a read-only memory (ROM) or other non-volatile storage device 106 coupled with bus 101 for storing non-volatile information and instructions for processing means 102 and audio-processing means 103. The computer system also includes a serial input/output (I/O) interface (SIO) 108 for providing a data interface from sound chip 125. In the currently preferred embodiment, SIO 108 is in a direct memory access (DMA) chip. However, it should be noted that SIO 108 could also be part of the digital signal processor 103. This alternate configuration is indicated by the dotted line connection 150 between digital signal processor 103 and sound chip 125.

The computer system of the present invention also includes a data storage device 107, such as a magnetic tape and disk drive, coupled with bus 101 for storing information and instructions, a display device 121, such as a cathode ray tube, liquid crystal display, etc., coupled to bus 101 for displaying information to the computer user, an alpha-numeric input device 122 including alpha-numeric and other keys, etc., coupled to bus 101 for communicating information and command selections to processor 102 and audio-processor (DSP) 103 (i.e., an audio functional unit), and a cursor control 123 for controlling cursor movement.

The system also includes a hard copy device 124, such as a plotter or printer, for providing a visual representation of the computer images. Hard copy device 124 is coupled with processor 102, audio-processor 103, main memory 104, non-volatile memory 106 and mass storage device 107 through bus 101. Finally, the system includes a sound chip 125 for providing audio recording and play back devices to have their audio outputs processed by digital signal processor 103.

Of course, certain implementations and uses of the present invention may neither require nor include all of the above components. For example, in certain implementations a keyboard or cursor control device for inputting information to the system may not be required. In other implementations, it may not be required to provide a display device displaying information. A digital signal processor is also not required if processor 102 is capable of providing the desired audio processing. In this case, sound chip 125 is connected to an I/O port on bus 101. Furthermore, the computer system may have more than one digital signal processor.

Overview of the Sound Subsystem

FIG. 2 shows in the currently preferred embodiment of the sound subsystem of the computer system of FIG. 1. Referring to FIG. 2, serial I/O interface (SIO) 201 is coupled to codecs 204–207 as a data interface to audio devices coupled between the system bus 101 and each of codecs 204–207. Although the currently preferred embodiment operates with a DSP-based computer, the present invention can operate on any computer system which contains the proper interface support circuitry. SIO 201 is clocked by clock 203. Furthermore, although codecs are specified herein, the present invention could operate with any audio functional unit. Codecs 204–207 also receive the same clock signal from master clock 203.

SIO 201 is coupled to codecs 204–207 via its serial input/output (I/O) interface 202. In the currently preferred embodiment, serial interface 202 is coupled to each of the codecs 204–207 using four wires. It should be noted that the present invention can operate with any number of codecs. Also coupled to each of codecs 204–207 are sound recording and playback devices (not shown). These devices are typically speaker or headphone amplifiers and microphone preamplifiers.

The basic sound subsystem of the present invention performs several functions. These functions are providing a connection for the input data stream (e.g., from a microphone or line), generating the underlying output stream, and processing and moving the final output stream to the proper I/O device (e.g., speaker).

In order to implement these functions, SIO 201 provides real-time functionality for the computer system (FIG. 1) by dividing its operating time into "frames" of equal length. In the currently preferred embodiment, the length of a frame in terms of time is derived from the clocking signal output from master clock 203. In the currently preferred embodiment, master clock 203 generates a 24.576 MHz clock signal. In the currently preferred embodiment, the 24.576 MHz signal is fed to each of the codecs 204–207 as its master clock signal.

SIO 201 includes clock divider 208 which is clocked by master clock 203. Divider 208 produces the clock signal for the serial bitstream between SIO 201 and codecs 204–207 in response to a divisor input into clock divider 208.

In the currently preferred embodiment, the bitstream which is transferred according to the clock signal is formatted in frames. Each frame is further divided into subframes. In the currently preferred embodiment, there are four subframes in a frame. Each of codecs 204–207 (i.e., audio functional units) is tuned into one of the subframes. In other words, codecs receive and send audio data according to the serial protocol in timing with the subframe that the individual codec is tuned. For example, if codec 204 is tuned to the first subframe, it receives only data that is transferred in the first subframe and it sends data only during the first subframe. It is possible that more than one of codecs 204–207 is tuned into the same frame, but only for receiving data from the SIO 201.

To input and output data to codecs 204–207, SIO 201 utilizes sound input and output buffers (not shown). These buffers are managed by the computer system as a means of controlling the flow of audio data into and out of the processing units (e.g., DSP or main processor).

Codecs 204–207 receive and utilize the sound input and output. Each of codecs 204–207 accommodates 16-bits of sound data through the use of the serial interface protocol of the present invention. The computer system (FIG. 1) interfaces with codecs 204–207 via the serial protocol and transfers sound data out to and in from each of the codecs 204–207. In the currently preferred embodiment, the data is stored in 16 byte cache buffers in a DMA controller. By operating in this manner, the computer system may utilize burst cycles to transfer the data to and from the RAM (FIG. 1), thus increasing the utilization efficiency of bus 101.

Codecs 204–207 convert stereo audio signals from analog format into 16-bit digital format, and vice-versa. Each of codecs 204–207 includes all the required digital filtering, input multiplexors, input and output gain control, and muting circuitry, which is typically found in external circuitry in prior art sound systems. The currently preferred embodiment of the codec of the present invention provides an input multiplexor, input gain block, over-sampling analog to digital converters, digital decimation filtering, serial I/O control timing, digital bit I/O frame selection, power down control, output over-sampling filter, over-sampling digital to analog converters, output attenuation, and output muting. In addition, each of codecs 204–207 have eight digital control pins for control of or sensing external circuits, such as telephone line status, etc. In the currently preferred embodiment, codecs 204–207 can operate at sampling rates from 7,200 Hz (e.g., modem rates) to 48,000 Hz (e.g., pro-audio rates).

The Operation of the Stereo Codec

The stereo codec of the present invention is shown in FIG. 3. Referring to FIG. 3, each codec has two clock inputs that control its internal operation. These clock inputs are from master clock 203 and the serial clock from SIO 201 (FIG. 2), which is set in the SIO 201 to a value 1/n of the master clock, where n is the divisor. Both of these signals are shown in FIG. 3. In the currently preferred embodiment, the master clock signal is 24.576 MHz. The rate selection logic 304 in each codec 300 senses the ratio between the master clock and the serial clock and adjusts automatically to produce the desired sample data rate by modifying the decimation filters automatically. In the currently preferred embodiment, the sample rates that are supported are 48,000, 32,000, 24,000, 19,200, 16,000, 12,000, 9,600, and 8,000 samples per second. This represents divisions of 2, 3, 4, 5, 6, 8, 10, and 12 of the clock signal 96 kHz (i.e., 1/256 of 24.576 MHz where 256 bits are required per sample frame). The currently preferred embodiment also supports the additional rates of 7,200 and 44,100 samples per second. In this case, the master clock is set to 22.1184 MHz or 22.5792 MHz respectively.

Codec 300 has digital input pins 301 and output pins 302 for inputting and outputting sense and control lines. In the currently preferred embodiment, each codec is equipped with four digital input and four digital output pins, totalling eight pins in all. These pins are used to control output devices or to sense input conditions. Examples of I/O include the sensing of insertion of plugs into connectors, the sensing of "ring" and "off-hook" conditions (e.g. with regard to telephone connections), the controlling of speaker and headphone output amplifiers, the controlling of connections between local handsets and central office lines. These I/O pins are controlled and/or sensed by the serial port in SIO 201 (FIG. 2). Codec 300 also includes I/O pins for inputting and outputting audio data, shown as lines 305 and 306 respectively. In the currently preferred embodiment, each codec 300 also includes six I/O pins for inputting and outputting stereo audio data (two out, four in).

In the present invention, each codec has pins 303 which are utilized to select which of the available subframes of the stereo data plus auxiliary controls/status in the bitstream should be used for communication with the codec. In the currently preferred embodiment, each codec 300 has two pins. The two pins allow for up to four codecs to be coupled to SIO 201 (FIG. 2). The pins are set in either on/off configurations, each being unique to the codec. It should be noted that any configuration or identification scheme could be used which allows the individual codec to identify its particular subframe. If the codec has four converter pairs rather than two, then only a single pin is required to select the first two subframes or the last two subframes. A codec with eight converter pairs requires no subframe selection pins. The serial output and input lines for a codec are tri-state except during the subframe associated with the codec.

In the currently preferred embodiment, codec 300 communicates with tile SIO 201 over the 4-wire serial port protocol of the present invention. The serial port protocol accommodates up to eight channels of audio and up to 20 bits of resolution. The protocol of the present invention also allows specific sample rate changes simply by changing the data transfer rate of the serial channel (as described above).

Rate Control Logic

The rate control logic 304 of codec 300 in FIG. 3 is designed to determine the ratio of the master clock to the serial bit rate clock. The circuitry to do this task consists of a counter and a latch, plus some control logic, and is shown in FIG. 8.

The control logic 804 signals via load line 805 the latch 802 to load the value in the counter 801 when a positive transition is detected on the serial clock. The same signal is used to load an initial value of 1 from the initial value register 803 into the counter 801. Note that register 803 may be implemented by wiring inputs to counter 801 to logic true and false voltages—a separate register is not required. By following proper design rules well known in the art, these two operations can be triggered on the same signal 805 without losing the current counter value. Subsequent master clocks 806 increment the counter 801. Note that both master clock 806 and serial clock 807 are fed into the control logic, and the assumption is that the serial clock is derived form the master clock by a divisor in the SIO port.

If for example there are 4 master clock 806 edges for every serial clock 807 edge, the counter will be loaded with a 1 on every fourth, and count to four before being reloaded again. The value 4 is transferred to the latch 802.

The latch 802 value is used to program the digital decimation filters and other functions within the codec to effect a rate change. Comparator circuitry can be used to detect a change in the latched value, which can be used to force the mute function on while the change in rate is made.

Control logic 804 also ensures there is synchronization between the clock transistors of the serial clock and the master clock.

In one of the preferred embodiments, a DSP is used within the codec. The rate divisor is read by the DSP, and changes to its program are made accordingly to effect the rate change (all filtering, etc., is handled by the DSP rather than by fixed logic). Note that an alternative embodiment is to reset the counter 801 when the serial clock edge is detected—effectively loading the initial value of zero. This results in a value of one less than the divisor in the latch (3 rather than 4 in our example). This method allows use of simpler counter logic (no preset logic is required, only reset). This number must be incremented before being used in subsequent logic. In the case where the value is read by a program, incrementing the value adds only a single instruction to the program. In addition, if the program is simply comparing the value in register 802 to a table to find a match, the table can contain value one less than the "correct" value, eliminating the additional step of incrementing the value.

Thus, the method and apparatus for determining the sample rate from the master clock and serial clock is disclosed.

The Serial Port

The protocol of the present invention transfers data in a bitstream comprising successive frames of data. Each frame of data consists of multiple subframes. In the currently preferred embodiment, the protocol of the present invention utilizes a 64-bit data stream per stereo subframe and accommodates up to four subframes per frame. In the currently preferred embodiment, the 64-bits of data consists of 40 bits of stereo data (i.e., 20 left, 20 right, wherein the four least significant bits are zero) and 24 bits of control (i.e., when data goes to the codec) and status (i.e., when data is from the codec) information.

To support the protocol of the present invention, SIO 201 (FIG. 2) uses four 32-bit registers for each serial port. Two of the registers are the data input and data output registers which hold the packed stereo data. In the currently preferred embodiment, the data is packed in left/right (L/R) format. The other two registers are the control register and the status register which hold the control and status data respectively and are both serviced by SIO 201. The serial port of the present invention combines the contents of the control and data output register to create the bitstream going to codecs 204–207 and accepts incoming data into the data-in and status registers. The control register changes infrequently, and the status register is examined by the computer system only when a change of status occurs. Some bits in the status register may be used to generate an interrupt (e.g., error flag, overflow bits, etc.). The audio L/R data, on the other hand, comprises a real-time bitstream and must be moved via DMA or under processor control to and from sound input and output buffers respectively in the system memory.

Some additional registers are utilized. The registers needed to support the currently preferred embodiment of the protocol of the present invention for each stereo I/O channel (i.e., for each subframe) are shown in FIG. 4. Other registers, however, are required to support the protocol. For example, if DMA is utilized, a DMA register is required to hold the data being read from memory or written to memory. DMA address registers am also required, as shown. Shift registers are also required for transferring the data to/from the serial bitstream.

The codec control register contains gain settings, input selector settings, mute, etc. for controlling the function of the codec corresponding to the 24 bits of auxiliary data (i.e., control data) that is appended to the audio data being transmitted to the codec. The auxiliary data is loaded into the codec control register by the host or processor. The values stored in this register change infrequently and are repeated in the output stream for every sample.

The codec status register receives the 24 bits of auxiliary data (i.e., status data) from the codec. In response to a change in the status data from its previous value, the SIO channel generates a maskable interrupt. The data in the codec status register normally remains the same (i.e., static) for long periods. When an error occurs, such as an overflow in the A/D subsystem of the codec or when one of the bit input lines changes state, the status data in the codec status register changes.

The buffer size register stores the size of the read/write buffer for operations to main memory (i.e., DMA). The buffer size register, in the currently preferred embodiment, is 10 bits in size. This supports buffers up to 1024 samples in size.

In the currently preferred embodiment, the incoming 24.576 MHz clock is first divided by 4, 3, or 2 to produce sample bit rates for 24, 32, or 48 KHz respectively. This bit clock is used for the serial port, generating serial port clock rates of 6.144 MHz, 8.192 MHz, and 12.288 MHz. The serial port clock rate is also fed to a divide-by-four counter and then into the 16-bit counter (i.e., the 6 and 10-bit sections). This is shown in FIG. 4 as the current state counter.

The output and input buffer base address registers store the base address of the buffer of data being transferred from and to DSP 201, data which is being converted from digital-to-analog and vice versa respectively. The sample rate control register contains the divisor used by the serial port to generate the sample rate of the serial port with the master clock signal. The interrupt mask register allows the program to set up interrupts (i.e., enable and disable).

Serial Port Protocol

The currently preferred embodiment of the present invention interconnects an audio processing system through the serial port to audio data converters (i.e., codecs 204–207) using four signal lines. In the currently preferred embodiment, the four signal lines translate into 4-pins interconnecting up to eight audio channels. The serial protocol of the present invention utilizes the four pins for all I/O functions. The four pins consist of a clock pin, a synchronization pin, a serial data-in pin and a serial data-out pin. All control and status functions are accessed using these pins. Thus, the four pins provide a means for exerting control and reading status, a means for setting the sample rate for the codecs in the sound subsystem, provide simplified interconnect to industry-standard devices, and include substantial expansion capabilities for the future.

The data transferred from the serial port is formatted into frames. In the currently preferred embodiment, each frame is 256-bits long. Each frame is divided into four 64-bits subframes, each subframe being a stereo pair (i.e., four total). In the currently preferred embodiment of the present invention, each subframe contains two 20-bit stereo audio data values (40 bits total), indicated as Left Data and Right Data, plus a 24-bit auxiliary field. An example of the currently preferred embodiment of a frame of the present invention is shown in FIG. 5. In the currently preferred embodiment, the sound data is formatted with the most significant bit (MSB) first, including trailing zeros when full resolution is not available (e.g., when only 16 of the 20-bits is being used). It should be noted that time is assumed to move from left to right in the diagram.

A subframe consists of two words (i.e., 64 bits) and forms a stereo pair. Referring to FIG. 6, each word start in the bitstream is indicated by a word synchronization (WS). Actually, there is a word synchronization in the beginning and middle of the subframe. Note that a frame synchronization (FS) is also a word synchronization. The diagram of the subframe is shown in FIG. 6.

As stated earlier, in the currently preferred embodiment, the data output from this system carries up to 20 bits of audio data per subframe (40 bits total) and a 24 bit of auxiliary data. The 24 bits of auxiliary data output is control data, for such things as input selection, mute, input gain, output attenuation, bit I/O unit outputs, and extension bits. The 24 bits of auxiliary control data are separated into two sections, indicated as AUX1 and AUX2. The data input from each codec carries the same audio format, but the 24 bits of auxiliary data are used for status, including revision number, bit I/O unit inputs, valid data bits, overflow bits, error codes and expansion bits. The combination of AUX A and B form the 24-bit auxiliary datum for the subframe. Note that each subframe has its own auxiliary data as well as its own sound data. In the currently preferred embodiment, the serial data is carried on four digital lines defined as follows:

S_Clock: Serial clock; input to codec. In the currently preferred embodiment, the negative transition indicates data change and the positive edge is the sampling edge. Furthermore, the serial clock always runs at 256 times the sample rate.

S_Sync: Serial data synchronization (sync); input to codec. This S_Sync signal is used to indicate the start of a word or a frame. It should be noted that a frame start is also a word start. In the currently preferred embodiment, the S_Sync signal line is normally low and transitions high for two bit cells at the beginning of a frame or one bit cell at the beginning of a word other than the first word in a frame. A diagram of each type of synchronization pulse is shown in FIG. 7. Referring to FIG. 7, the numbers shown above are the bit numbers for the word. Cell 1 is always MSB of the sound data in this format, and bit 32 is the last bit of the auxiliary data. The codec produces an error code if any other format sync is detected. In response to an error code, the output is automatically muted.

S_Din: Serial D/A data in; input to codec: Each codec only responds to the selected subframe and ignores data in other subframes. It should be noted that more than one codec can receive data from the same subframe. Each 64-bit subframe (two words) has the following internal structure:

Word A subframe cells 1–20 for Left D/A data.

subframe cells 21–32 for Auxiliary Control A data.

Word B subframe cells 33–52 for Right D/A data.

subframe cells 53–64 for Auxiliary Control B data.

The Auxiliary Control A and B data is concatenated to produce a 24-bit field. These bits are used to specify control for each of codecs 204–207. In the currently preferred embodiment, the 24-bit field is encoded as follows:

Auxiliary cell 1 (subframe cell 21): Expand bit. In the currently preferred embodiment, the expand bit must be zero for now. If it is 1, an error is generated. This bit is utilized for an expanded command set in the future. In the currently preferred embodiment, if this bit is detected, all other auxiliary control bit cells are ignored, error bits are generated in the status auxiliary bits, and the audio processing continues as usual.

Auxiliary cell 2 (subframe cell 22): Mute. In the currently preferred embodiment, a logical value of 1 causes a "soft mute" of the D/A output. The mute bit also acts as a "reset" condition on the A/D valid counter so that mute can be used when changing sample rates.

Auxiliary cells 3, 4 (subframe cells 23, 24): Input select. In the currently preferred embodiment, the auxiliary cell 3 controls the 2-to-1 input multiplexors for the left channel, and cell 4 controls the multiplexors for the right channel (value 0 for input 1, value 1 for input 2).

Auxiliary cells 5 to 8 (subframe cells 25 to 28): Left Input Gain. In the currently preferred embodiment, the auxiliary cells 5 to 8 set the gain value of the left A/D input from 0 to 22.5 db in 1.5 db steps, wherein a hex value of 0 equals a gain of 0 db, and a hex value of F equals a gain of 22.5 db. In the currently preferred embodiment, the bits are transferred MSB first.

Auxiliary cells 9 to 12 (subframe cells 29 to 32): Right Input Grain. In the currently preferred embodiment, the auxiliary cells 9 to 12 set the gain value of the right A/D input from 0 to 22.5 db in 1.5 db steps, wherein a Hex value of 0 equals a gain of 0 db, and a hex value of F equals a gain of 22.5 db. In the currently preferred embodiment, the bits are transferred MSB first.

Auxiliary cells 13 to 16 (subframe cells 53 to 56): Left D/A output attenuation. In the currently preferred embodiment, auxiliary cells 13 to 16 set the attenuation value for left D/A output from 0 to 22.5 db in 1.5 db steps. In the currently preferred embodiment, a Hex value of 0 indicates that there is to be no attenuation while a hex value of F indicates an 22.5 db. In the currently preferred embodiment, the bits are transmitted MSB first.

Auxiliary cells 17 to 20 (subframe 57 to 60): Right D/A output attenuation. In the currently preferred embodiment, auxiliary cells 17 to 20 set the attenuation value for right D/A output from 0 to 22.5 db in 1.5 db steps. In the currently preferred embodiment, Hex value of 0 means, no attenuation, while a hex value of F means an attenuation of 22.5 db. In the currently preferred embodiment, the bits are shipped MSB first.

Auxiliary cells 21 to 24 (subframe cells 61 to 64): Output control. In the currently preferred embodiment, auxiliary cells 21 to 24 control four output (digital) pins on the codec. In the currently preferred embodiment, a logical value of 1 results in a high output, and a logical value of 0 results in a low output. In the currently preferred embodiment, after the power-up sequence, these four bits are initialized to zero.

S_Dout: Serial A/D data out; output (tri-state) from codec. The codec only drives the S_Dout line during the subframe to which it is assigned and tri-states during the other subframes. Thus, only one codec may drive a given subframe. Once again, in the currently preferred embodiment, each 64-bit subframe (two words) has the following internal structure:

Word A
subframe cells 1–20 for Left A/D data.
subframe cells 21–32 for Auxiliary Status A data.
Word B.
subframe cells 33–52 for Right A/D data.
subframe cells 53–64 for Auxiliary Status B data.

The Auxiliary Status A and B data are concatenated to produce a 24-bit field for status from the codec (e.g., codecs 204'207). In the currently preferred embodiment, the 24-bit field is encoded as follows.

Auxiliary cell 1 (subframe cells 21): Extend bit. In the currently preferred embodiment, the extend bit is zero. As indicated, this bit allows for expansion later. If a value of 1 is received, an error is indicated.

Auxiliary cell 2 (subframe cell 22): A/D Valid Data. In the currently preferred embodiment, a logical value of 1 indicates valid A/D data, and a logical value of 0 indicates invalid data. The auxiliary cell 2 is used to indicate that the A/D has completed initialization following power up or rate change. The A/D valid data is also used to indicate low power mode, or mute condition.

Auxiliary cell 3, 4 (subframe cells 23,24): A/D Overflow status (bit 3 for left, bit 4 for right). In the currently preferred embodiment, each of auxiliary cells 3 and 4 indicates that clipping is occurring in the A/D conversion and filtering process.

Auxiliary cells 5 to 8 (subframe cells 25 to 28): Error Number. In the currently preferred embodiment, the error number is zero unless an error condition exists. In the currently preferred embodiment, bits are shipped MSB first. In the currently preferred embodiment, error conditions are:

1) S_Din auxiliary bit 1 is set. Error code=0001 (unable to understand control word). Data is still assumed to be valid.

2) Detection of an Alternate Format Sync pulse. Error code=0010 (unable to understand data format). This automatically causes a mute of the analog output.

3) Serial clock frequency out of allowable range. Error code=0011 (serial clock out of range). This automatically causes a mute of the analog output.

The above list is only that of the currently preferred embodiment. Other error codes are possible.

Auxiliary cells 9 to 12 (subframe cells 29 to 32): Revision Number. In the currently preferred embodiment, the revision number is set to 0000. Future enhancements of the protocol should use other numbers. This will allow a SIO channel to adapt automatically to revisions.

Auxiliary cells 13 to 16 (subframe cells 53 to 56): Not used. In the currently preferred embodiment, auxiliary cells 13 to 16 are reserved for future use and are set to 0000.

Auxiliary cells 17 to 20 (subframe cells 57 to 60): Not used. In the currently preferred embodiment, auxiliary cells 17 to 20 reserved for future use and are set to 0000.

Auxiliary cells 21 to 24 (subframe cells 61 to 64): Input Sense: In the currently preferred embodiment, the input sense carries values from the four (digital) input pins on the codec. In the currently preferred embodiment, a high voltage on one of the pins produces a logical value of 1, and a low voltage produces a logical value of 0.

In order to interconnect a codec utilizing a prior art protocol to the system, the same four lines may be used. Since the four serial port pins have similar functions as other serial bus protocols, a single additional pin may be used to select between the two serial data formats.

The protocol of the present invention uses a unique method for setting the sample rate of the codec. Simply by setting the clock rate of the serial port, a codec in the system can reprogram its internal functions to provide the selected sample rate. In the currently preferred embodiment, the serial port clock rate is set at a rate related to the master clock pin by the programmable clock divider in SIO 201 (FIG. 2). In the digital filters in the codec, well-known techniques can be used to decimate the input or up sample the output. The method for setting the sample rate of the codec utilizes a codec serial port theft determines the clock rate of the serial port as the division from the master clock.

Referring again to FIG. 3, the 4-wire serial port of the currently preferred embodiment of the present invention is shown as the serial data sync, serial data in, serial data out, and serial clock. Rate selection logic 304 receives both the serial clock and the master clock signal and, in response, selects the rate to the internal circuitry. For instance, in the currently preferred embodiment, rate selection logic 304 receives a master clock signal of 24.576 MHz. If a 24.576 MHz clock is used as a master clock, eight different rates can be derived:

| Sample Rate | Clock | Divider | Proposed Input Used | Proposed Output Use |
|---|---|---|---|---|
| 48.0 | 12.288 | 2 | HiFi Sound | HiFi Sound |
| 32.0 | 8.192 | 3 | Video | — |
| 24.0 | 6.144 | 4 | Std. Sound | Std. Sound |
| 19.2 | 4.9152 | 5 | — | — |
| 16.0 | 4.096 | 6 | HiSpeech | — |
| 12.0 | 3.072 | 8 | — | — |
| 9.6 | 2.4576 | 10 | Modems | Modems |
| 8.0 | 2.048 | 12 | Telephone | Telephone |

In addition, other rates can be utilized by using non-square wave versions of the clock, or by using other divider values.

Moreover, by arranging the data format as described above, it is possible to connect the codec of the present invention to bit streams designed to work with other industry-standard technology, with only a small amount of additional logic. Many standard parts use 32 clock periods to transfer data in a left-right order, with MSB transmitted first within each 32-bit field and zeroes filling unused bits. By properly setting the function of the auxiliary bits so proper operation results when all bits are zero, the data stream can be easily converted to match the requirements of the codec.

As described previously, the protocol of the present invention allows for future expansion. The audio data is 20 bits, even though present audio conversion technology is limited to only 16 or 18 bits of accuracy. In addition, both auxiliary data formats (i.e., control and status) include a bit for indicating expansion. If this bit is set, the following 23 status bits may have a completely different meaning.

The protocol of the present invention also reduces the number of pins required for both the audio processing system and the codec. By lowering the number of pins, the required die area is decreased, the package space is reduced, and the cost is reduced. Moreover, the present invention allows easy expansion of an audio system by simply adding additional codecs to the existing serial port. The present invention also adds the ability to support multiple sample rates easily and with low cost. No additional switching circuitry is required, and all codec signal processing functions including antialiasing filters are programmed by the serial port rate. Also, the present invention has the ability to easily upgrade the functionality of the data converters into an audio system without having to modify the base sound subsystem.

It should be noted that a low-cost implementation of the SIO may only support a single codec and one of the four subframes.

Whereas many alterations and modifications of the present invention will no doubt become apparent to a person of ordinary skill in the art after having read the foregoing description, it is understood that the particular embodiment shown and described by illustration is in no way intended to be limiting. Therefore, reference to the details of the preferred embodiments are not intended to limit the scope of the claims which themselves recite only those features regarded as essential to the invention.

Thus, a protocol for transferring audio data and control/status data between audio devices has been described.

We claim:

1. A method for transferring audio and auxiliary data between a first audio functional unit and a plurality of second audio functional units using a plurality of conductors, wherein said auxiliary data is capable of including control and status information, said method comprising the steps of:

said first audio functional unit generating a clock signal on a first of the plurality of conductors and generating a synchronization signal having variable length synchronization pulses on a second of the plurality of conductors that identifies each of a plurality of frames and each of a plurality of subframes contained therein:

said first audio functional unit combining audio data with auxiliary data having control information for controlling the plurality of second audio functional units to produce first combined data;

said first audio functional unit transferring said first combined data on a third of said plurality of conductors to the plurality of second audio functional units to control functionality of the plurality of second audio functional units and to request status information from the plurality of second audio functional units, such that the first audio functional unit exerts control on the plurality of second audio functional units;

each of said plurality of second audio functional units receiving a distinct portion of said first combined data only during separate and distinct subframes in each of the plurality of subframes to which said each second audio functional unit is tuned, wherein said step of receiving comprises the steps of said each of said plurality of second audio functional units identifying said plurality of frames and said separate and distinct subframes according to synchronization pulses of the synchronization signal on the second conductor, and each of said plurality of second audio functional units tri-stating inputs during subframes other than one of said separate and distinct subframes to which said each second audio functional unit is tuned in each of the plurality of frames:

said plurality of second audio functional units combining audio data with auxiliary data having status information to produce second combined data; and said each of said plurality of second audio functional units transferring said second combined data on a fourth of said plurality of conductors to the first audio functional unit to supply status information regarding the plurality of second audio functional units only during said separate and distinct subframes in each of the plurality of subframes to which said each of said plurality of second audio functional units is tuned and in response to a status request on said third of said plurality of conductors wherein said step of said each of said plurality of second audio functional units transferring said second combined data on a fourth of said plurality of conductors further comprises the steps of said each of said plurality of second audio functional units identifying said plurality of frames and said separate and distinct subframes according to synchronization pulses of the synchronization signal on the second conductor, and said each of sold plurality of second audio functional units tri-stating outputs during subframes other than one of said separate and distinct subframes to which said each second audio functional unit is tuned in each of the plurality of frames.

2. The method as defined in claim 1 wherein said steps of combining comprise multiplexing said audio data with said auxiliary data.

3. The method as defined in claim 2 wherein said steps of multiplexing includes the step of formatting said audio data and said auxiliary data into said one of the plurality of subframes, wherein each of said plurality of subframes comprises a pair of audio channels.

4. The method as defined in claim 3 wherein said steps of formatting comprises arranging said audio data and said auxiliary data within each of said plurality of subframes into a left and a right audio channel.

5. The method as defined in claim 1 further comprising the step of separating the audio data and auxiliary data.

6. An audio system comprising:

a first audio functional unit;

a second audio functional unit; and an interface coupled between the first audio functional unit and the second audio functional unit, wherein the interface comprises a first conductor, a second conductor, a third conductor and a fourth conductor, wherein the first conductor transfers combined audio and auxiliary data from the first audio functional unit to the second audio functional unit and the second conductor transfers combined audio and auxiliary data from the second audio functional unit to the first audio functional unit, and further wherein transfers between the first audio functional unit and the second audio functional unit occur according to a clock on the third conductor that is generated by the first audio functional unit and according to a synchronization signal on the fourth conductor;

wherein auxiliary data transferred on the first conductor controls functionality of the second audio functional unit and requests status information from the second audio functional unit, such that first audio functional unit exerts control over functionality of the second audio functional unit, and further wherein auxiliary data transferred on the second conductor provides status information regarding the second audio functional unit in response to status information requests from the first audio functional unit, such that the first audio functional unit accesses status information from the second audio functional unit and further wherein data is transferred in a plurality of frames comprising a plurality of subframes, said second audio functional unit being tuned to one of the plurality of subframes in each of the plurality of frames, such that said second audio functional unit receives data from and transfers data to the first audio functional unit only during a subframe associated with said second audio functional unit, said second audio functional unit disabling its outputs and inputs during subframes other than the subframe associated with said second audio functional unit, and wherein a variable length synchronization pulse on the fourth conductor indicates a start of each frame and each of the plurality of subframes to enable the first audio functional unit and the second audio functional unit to identify the subframe associated with said second audio functional unit.

7. The system defined in claim 6 wherein said second audio functional unit tri-states the outputs and inputs during subframes other than the subframe associated with said second audio functional unit.

8. A system comprising:

a first unit;

a plurality of audio functional units;

an interface connecting the first unit to the plurality of audio functional units, wherein the interface comprises a first conductor, a second conductor, a third conductor and a fourth conductor, wherein the first conductor transfers combined audio and auxiliary data from the first unit to the plurality of audio functional units and the second conductor transfers combined audio and auxiliary data from the plurality of audio functional units to the first unit, and wherein data transfers occur according to a clock signal on the third conductor generated by the first unit;

and further wherein data is transferred in frames comprising a plurality of subframes, each of said plurality of audio functional units tuned to one of the plurality of subframes, such that data transfers between the first unit and each of a plurality of audio functional units are made using the subframe associated with each audio functional unit, wherein inputs and outputs of each of said plurality of audio functional units are tri-stated during all other subframes, and wherein variable length synchronization pulses on the fourth conductor indicate a start of each frame and each of the plurality of subframes to enable the first unit and the plurality of audio functional units to identify the subframe associated with said each audio functional unit.

9. The system defined in claim 8 wherein the start of each frame is indicated to the plurality of audio functional units by one of the variable length synchronization pulse having a first length.

10. The system defined in claim 9 wherein a start of each subframe is indicated by one of the variable length synchronization pulse having a second length different from the first length.

11. The system defined in claim 10 wherein said one of the synchronization pulse having the second length comprises a word sync pulse.

* * * * *